(12) United States Patent
Oswal

(10) Patent No.: US 11,625,822 B2
(45) Date of Patent: Apr. 11, 2023

(54) SYSTEM AND METHOD FOR DETERMINING QUALITY ATTRIBUTES OF RAW MATERIAL OF TEXTILE

(71) Applicant: Ashok Oswal, Ludhiana (IN)

(72) Inventor: Ashok Oswal, Ludhiana (IN)

( * ) Notice: Subject to any disclaimer, the term of this patent is extended or adjusted under 35 U.S.C. 154(b) by 142 days.

(21) Appl. No.: 17/167,800

(22) PCT Filed: Oct. 12, 2018

(86) PCT No.: PCT/IB2018/057917
§ 371 (c)(1),
(2) Date: Feb. 4, 2021

(87) PCT Pub. No.: WO2020/030963
PCT Pub. Date: Feb. 13, 2020

(65) Prior Publication Data
US 2021/0272267 A1  Sep. 2, 2021

(30) Foreign Application Priority Data
Aug. 7, 2018 (IN) .............................. 201811029748

(51) Int. Cl.
*G06T 7/00* (2017.01)
(52) U.S. Cl.
CPC .. *G06T 7/0004* (2013.01); *G06T 2207/20182* (2013.01); *G06T 2207/30124* (2013.01)
(58) Field of Classification Search
CPC ......... G06T 2207/30124; G06T 7/0004; G06T 2207/20182
See application file for complete search history.

(56) References Cited

U.S. PATENT DOCUMENTS

| 2002/0054694 | A1* | 5/2002 | Vachtsevanos | G01N 21/956 |
| | | | | 382/156 |
| 2004/0030514 | A1* | 2/2004 | Popp | G05B 19/41875 |
| | | | | 702/81 |
| 2016/0364849 | A1* | 12/2016 | Liu | G06T 7/0004 |

FOREIGN PATENT DOCUMENTS

| CN | 105678788 B | * 11/2017 | ............... G06T 5/00 |
| CN | 107705306 A | * 2/2018 | ........... G06T 7/0008 |

(Continued)

OTHER PUBLICATIONS

Textile Retrieval Based on Image Content from CDC and Webcam Cameras in Indoor Environments (Year: 2018).*

(Continued)

*Primary Examiner* — Nizar N Sivji
(74) *Attorney, Agent, or Firm* — Dave Law Group LLC; Raj S. Dave

(57) ABSTRACT

Systems and methods are described for determining quality attributes of raw material of textile. According to an embodiment the for determining quality attributes of raw material of textile can include a processor coupled with a memory, the memory storing instructions executable by the processor to: receive one or more images of said raw material captured by an imaging device; enhance one or more features of said received one or more images by varying dynamic range of said one or more features of said received one or more images to obtain dynamically enhanced one or more images; extract values of one or more attributes of said enhanced one or more images, wherein said one or more attributes includes any or combination of staple length, fibre fineness, short fibre content, yarn hairiness, yarn count, yarn elongation, maturity and moisture content; and compare the extracted values with reference attribute values stored in a first database, wherein quality of said raw material is determined (Continued)

based on comparison of the extracted values with the reference attribute values.

9 Claims, 5 Drawing Sheets

(56) References Cited

FOREIGN PATENT DOCUMENTS

CN 108288272 A * 7/2018
CN 110310277 A * 10/2019

OTHER PUBLICATIONS

Classification of Textile Polymer Composites: Recent Trends and Challenges (Year: 2021).*
Study on the Detection of Yarn Hairiness Morphology Basedon Image Processing Technique (Year: 2011).*
A Vision Based System for High Precision Online Fabric Defect Detection (Year: 2011).*
Yarn Hairiness Determination Using Image Processing Techniques (Year: 2011).*

* cited by examiner

SYSTEM AND METHOD FOR DETERMINING QUALITY ATTRIBUTES OF RAW MATERIAL OF TEXTILE

CROSS-REFERENCE TO RELATED APPLICATIONS

This application is the U.S. National Stage Entry of PCT/IB2018/057917, filed on Oct. 12, 2018, which is claims priority from the Indian Application No. 201811029748, filed on Aug. 7, 2018, the entire disclosures of which are incorporated herein by reference as part of the disclosure of this application.

TECHNICAL FIELD

The present disclosure relates generally to textile industry. In particular, the present disclosure relates to monitoring quality of raw material of a textile. More specifically it pertains to systems and methods for determining quality attributes of raw material of textile.

BACKGROUND

Background description includes information that may be useful in understanding the present invention. It is not an admission that any of the information provided herein is prior art or relevant to the presently claimed invention, or that any publication specifically or implicitly referenced is prior art.

Fibre can be either cellulose based or non cellulose based i.e. it can be natural or man-made. Natural fibre can be defined as substances produced by plants and animals that can be spun into filament, thread or rope and further be woven, knitted, matted or bound. Natural fibre can include cotton, linen, silk, wool, viscose and the like. Manufactured fibre (MF) also known as man-made fibres are produced from a suitable raw material as a thick, sticky liquid like petroleum which that can be spun or extruded through spinneret holes, forming streams that can be solidified into fibres. MF can include Nylon, Polyester, acrylic and the like.

In textile industry quality of the finished product is directly related to the quality of the fabric when it is received as a roll. Even if manufacturer works with state-of-the-art equipment and utilizes the most outstanding manufacturing methods, it will not counterbalance the effects of using defective, non performing or non compliant raw materials. Many factories in the textile industry experience quality issues with their final products as a result of inadequate raw materials passed down the production line. What some factory managers often may not realize is that these problems are easily avoidable. Therefore, quality management of raw materials should be embedded in the development stage and is crucial for avoiding any costly quality issues further down the line. Quality and compliance of raw materials are essential for ensuring supply chain organization and decreasing potential quality risks later during production. This can be done through implementing effective quality management systems which will significantly improve operational performance, as well as save valuable time and money leading to higher quality goods and increased profitability. Quality management of the development stage is the most crucial step of the manufacturing process. Ensuring that the right products are produced using high-quality materials will reduce quality risks by as much as 70%.

Small and medium-sized enterprises (SME) sector plays a pivotal role both in the production and employment. However, SMEs, due to availability of limited amount of finances, are not able to invest in the sophisticated material checking R&D machines which are only limited to large scale sector. Therefore, the objective is to empower the SME's yarn, fabric and apparel making sectors. Also, the end-users or buyers cannot check the quality of the fabric or textile or apparel they are purchasing, the buyers are often mislead in to buying the wrong product i.e. the buyers or end-user are promised a product made up of different raw material and they end up buying a different raw material product altogether. For example, a buyer intends to buy a pure cotton shirt and the seller sells the shirt at promising the shirt is 100% cotton, but there is no method for the buyer to check authenticity of the promise made by the seller.

Efforts have been made in the past to overcome problems associated with evaluate/assess parameters/characteristics of raw materials that are used in textile industry during manufacture of yarn, and finished textile or fabric. Many brands make use of textile quality management solution providers, who are experts in the industry and can guide through the entire process, ensuring quality at every step of the way. Further, the parameters can be checked based on testing the sample of the raw material or the textile in a laboratory.

For example, U.S. Pat. No. 5,270,787A titled "Electro-Optical Methods and Apparatus for High Speed, Multivariate Measurement Of Individual Entities In Fibre Or Other Samples"), and Suter-Webb array, methods can provide complete fibre length distributions or PDFs. These methods are known to be too expensive, imprecise, or slow for high volume testing. It is also known that AFIS, as a consequence of its rather aggressive opening to produce single fibres, breaks fibres, thus leading to increased SFC and decreased LFC, thus biasing the length data products.

There is, therefore, a need in the art to provide a system and method that can enable the farmer who is at the weakest end in a textile chain, to get optimum value for his/her production. An imaging device such as digital camera associated with a computing device can be used to check quality of the product thereby assisting him/her to get best value for his/her produce and not cheated by the agents, arthiyas, mill selectors and ginners. Further, to evaluate/assess parameters/characteristics of materials at various stages of production of the textile where the evaluation/assessment can be done in real time, that does not require an expert to perform various measurements, that is time as well as cost efficient, which can be used by the government agencies to calculate the amount of tax that needs to be paid.

OBJECTS OF THE PRESENT DISCLOSURE

Some of the objects of the present disclosure, which at least one embodiment herein satisfies are as listed herein below.

It is an object of the present disclosure to provide a system and method for determining quality attributes of a raw material of a textile.

It is another object of the present disclosure to provide a system and method that enables determining quality attributes of a raw material of a textile in real time, thus reduces time required for determination.

It is another object of the present disclosure to provide a system and method for determining quality attributes of a raw material of a textile that is cost efficient.

It is another object of the present disclosure to provide a system and method for determining quality attributes of a raw material of a textile that is portable and easy to use.

It is another object of the present disclosure to provide a system and method that empowers entire chain of textile industry to determine quality attributes of a raw material of a textile.

It is another object of the present disclosure to provide a system and method that enables determining quality attributes of a raw material of a textile at every stage that includes fibre, yarn and fabric.

SUMMARY

The present disclosure relates generally to textile industry. In particular, the present disclosure relates to monitoring quality of raw material of a textile. More specifically it pertains to systems and methods for determining quality attributes of raw material of a textile. System and methods for determining quality related attributes of raw material of a textile. An aspect of the present disclosure pertains to a system for determining quality attributes of a raw material of a textile, the system can include: a processor coupled with a memory, the memory storing instructions executable by the processor to: receive one or more images of said raw material captured by an imaging device; enhance one or more features of said received one or more images by varying dynamic range of said one or more features of said received one or more images to obtain dynamically enhanced one or more images; extract values of one or more attributes of said enhanced one or more images, wherein said one or more attributes includes any or combination of staple length, fibre fineness, short fibre content, yarn hairiness, yarn count, yarn elongation, maturity and moisture content; and compare the extracted values with reference attribute values stored in a first database, wherein quality of said raw material is determined based on comparison of the extracted values with the reference attribute values.

In an aspect, the processor of the present disclosure can be configured to extract Histogram of oriented gradients (HOG) features from each enhanced one or more images, and averaging HOG features thus extracted to obtain corrected said enhanced one or more images.

In an aspect, the system of the present disclosure can comprise a computing device configured to present the determined quality of said raw material.

In an aspect, the imaging device of the present disclosure can comprise a digital camera operatively coupled with said computing device; further, the imaging device can have an illuminating source.

In an aspect, the one or more features of the present disclosure can comprises any or a combination of a grey scale level, contrast, edge exposition, pseudo-colorization, sharpness, noise level, space filtration, interpolation, magnification, and compensation of the influence of interference factors.

In an aspect, the captured one or images, enhanced one or more images, extracted values of one or more attributes, and retrieved reference attribute values are stored in any or a combination of said first database and a second database.

Another aspect of the present disclosure pertains to a method for determining quality attributes of a raw material of a textile using a processor that executes instructions that are stored in memory, said method comprising the steps of: receiving, by said one or more processors, one or more images of said raw material captured by the imaging device; enhancing, by said one or more processors, one or more features of said received one or more images by varying dynamic range of said one or more features of said received one or more images to obtain dynamically enhanced one or more images; extracting, by said one or more processors, values of one or more attributes of said enhanced one or more images; comparing, by said one or more the extracted values with reference attribute values stored in a database; and determining, by said one or more processors, quality of said raw material based on comparison of the extracted values with the reference attribute values.

In an aspect, the method of the present disclosure can further comprise extracting Histogram of oriented gradients (HOG) features from each enhanced one or more images, and averaging HOG features thus extracted to obtain corrected said enhanced one or more images.

DETAILED DESCRIPTION

Figure 1:
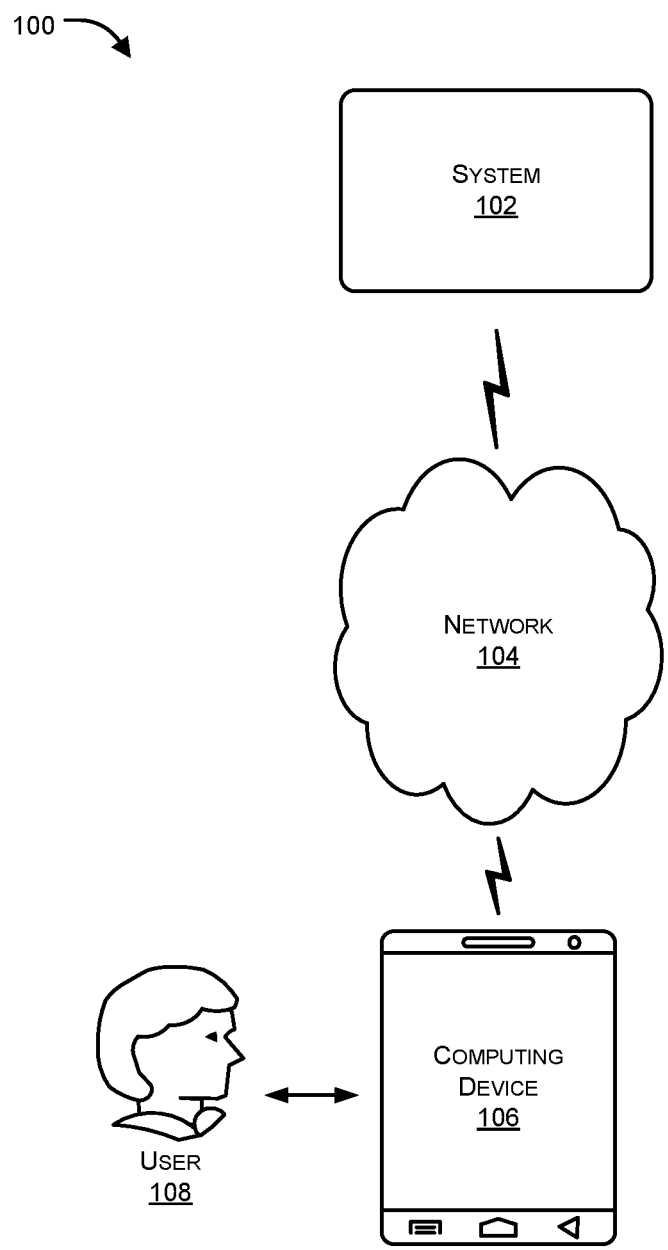
FIG. 1 illustrates an exemplary overall architecture in which or with which proposed system can be implemented in accordance with an embodiment of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, and firmware and/or by human operators.

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Exemplary embodiments will now be described more fully hereinafter with reference to the accompanying drawings, in which exemplary embodiments are shown. These exemplary embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein. Various modifications will be readily apparent to persons skilled in the art. The general principles defined herein may be applied to other embodiments and applications without departing from the spirit and scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named element.

Embodiments of the present invention may be provided as a computer program product, which may include a machine-readable storage medium tangibly embodying thereon instructions, which may be used to program a computer (or other electronic devices) to perform a process. The term "machine-readable storage medium" or "computer-readable storage medium" includes, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). A machine-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

All methods described herein may be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Various terms as used herein are shown below. To the extent a term used in a claim is not defined below, it should be given the broadest definition persons in the pertinent art have given that term as reflected in printed publications and issued patents at the time of filing.

The present disclosure relates generally to textile industry. In particular, the present disclosure relates to monitoring quality of raw material of a textile. More specifically it pertains to systems and methods for determining quality attributes of raw material of textile.

The present disclosure relates generally to textile industry. In particular, the present disclosure relates to monitoring quality of raw material of a textile. More specifically it pertains to systems and methods for determining quality attributes of raw material of a textile. System and methods for determining quality related attributes of raw material of a textile. An aspect of the present disclosure pertains to a system for determining quality attributes of a raw material of a textile, the system can include: a processor coupled with a memory, the memory storing instructions executable by the processor to: receive one or more images of said raw material captured by an imaging device; enhance one or more features of said received one or more images by varying dynamic range of said one or more features of said received one or more images to obtain dynamically enhanced one or more images; extract values of one or more attributes of said enhanced one or more images, wherein said one or more attributes includes any or combination of staple length, fibre fineness, short fibre content, yarn hairiness, yarn count, yarn elongation, maturity and moisture content; and compare the extracted values with reference attribute values stored in a first database, wherein quality of said raw material is determined based on comparison of the extracted values with the reference attribute values.

In an aspect, the processor of the present disclosure can be configured to extract Histogram of oriented gradients (HOG) features from each enhanced one or more images, and averaging HOG features thus extracted to obtain corrected said enhanced one or more images.

In an aspect, the system of the present disclosure can comprise a computing device configured to present the determined quality of said raw material.

In an aspect, the imaging device of the present disclosure can comprise a digital camera operatively coupled with said computing device; further, the imaging device can have an illuminating source.

In an aspect, the one or more features of the present disclosure can comprises any or a combination of a grey scale level, contrast, edge exposition, pseudo-colorization, sharpness, noise level, space filtration, interpolation, magnification, and compensation of the influence of interference factors.

In an aspect, the captured one or images, enhanced one or more images, extracted values of one or more attributes, and retrieved reference attribute values are stored in any or a combination of said first database and a second database.

Another aspect of the present disclosure pertains to a method for determining quality attributes of a raw material of a textile using a processor that executes instructions that are stored in memory, said method comprising the steps of: receiving, by said one or more processors, one or more images of said raw material captured by the imaging device; enhancing, by said one or more processors, one or more features of said received one or more images by varying dynamic range of said one or more features of said received one or more images to obtain dynamically enhanced one or more images; extracting, by said one or more processors, values of one or more attributes of said enhanced one or more images; comparing, by said one or more the extracted values with reference attribute values stored in a database; and determining, by said one or more processors, quality of said raw material based on comparison of the extracted values with the reference attribute values.

In an aspect, the method of the present disclosure can further comprise extracting Histogram of oriented gradients (HOG) features from each enhanced one or more images, and averaging HOG features thus extracted to obtain corrected said enhanced one or more images.

FIG. 1 illustrates an exemplary overall architecture in which or with which proposed system can be implemented in accordance with an embodiment of the present disclosure.

As illustrated, in a network implementation, the system 102 can be communicatively coupled with computing device 106 through network 104. The computing device can be integrated with an imaging device 108 (interchangeably referred to as camera 108 hereinafter). The system 102 can be implemented using any or a combination of hardware components and software components such as a server, a computing system, a computing device, a security device and the like, such that embodiments of the present disclosure can determine various attributes associated with the quality of raw material of a textile.

Further, the system 102 can interact with a user 110, through the computing device 106 or through applications residing on the computing device 106. In an implementation, the system 102 can be access by applications residing on any operating system, including but not limited to, Android™, iOS™, and the like. Examples of the computing devices 106 can include, but are not limited to, a portable computer, a personal digital assistant, a handheld device, and a workstation. In a preferred embodiment, the computing devices 106 are mobile phones having the imaging device 108. The imaging device 108 can include but not limited to digital camera to capture one or more images of the raw material.

The network 104 can be a wireless network, a wired network or a combination thereof that can be implemented as one of the different types of networks, such as Intranet, Local Area Network (LAN), Wide Area Network (WAN), Internet, and the like. Further, the network 104 can either be a dedicated network or a shared network. The shared network can represent an association of the different types of networks that can use variety of protocols, for example, Hypertext Transfer Protocol (HTTP), Transmission Control Protocol/Internet Protocol (TCP/IP), Wireless Application Protocol (WAP), and the like.

In an embodiment, the system 102 can enable registration of the user 110. The registration can be based on details such as name, address, e-mail address, phone number, and the like. Also, the system 102 can utilize a unique identifier such as PAN card, Unique ID (UID) Card, voter ID, and the like, provided by the user 110, to verify the authenticity of the user 110. Also, in an embodiment, said unique identifier can avoid multiplicity of registration of the same user.

In an embodiment, the camera 108 can include a illuminating source (not shown) that can be used in conditions wherein the natural light is dull. The illuminating source can be configured such that it can provide a flash of light or a continuous light such that the one or more images can be captured with precision, accuracy, clarity and the like.

In an embodiment, the system 102 can acquire the one or more images or a video of the raw material using a camera 108 communicatively coupled to the computing device 106 associated with the user 110. It would be appreciated by the person skilled in the art that image captured can either be saved temporarily on the computing device 106 or can be directly transmitted to the system 102 for analysis and determination. In an embodiment, the one or images can be stored on any or a combination of a first database and a second database (not shown). It would be appreciated that the database can be present on a cloud/server. In one embodiment, the system 102 can store the one or more images captured.

In an embodiment, the system 102 can be used to analyze the one or more images captured for checking one or more attributes associated with the raw material. The system 102 can be used to extract the reference attribute values. The reference attribute values and the extracted one or more attributes can be compared and based on the comparison the quality of the raw material can be determined.

It should be appreciated that based on analysis of the one or more images captured using the camera 108, the one or more attributes can be extracted such that the quality of the raw material can be accurately determined in real time hence reduce time delay.

In an aspect, the system 102 can present the determined one or more attributes associated with the raw material to the user 110 on his/her computing device 108. It would be appreciated by the person skilled in the art that based on the extracted one or more attributes associated with the raw material, the quality of the raw material can be determined and determined quality of raw material can be presented on the computing device 106 associated with the user 110.

In an embodiment, the system 102 can be embedded in the computing device 106 associated with the user 110. The camera 108 of the computing device 106 can be used to capture the one or more images and processes such as the image processing, one or more attributes extraction and quality of the raw material determination can be performed by the system 102 embedded in the computing device 106. Further the determined quality of the raw material obtained after analysis of the one or more attributes can be displayed on the display screen of the computing device.

It would be appreciated by the person skilled in the art that the user can use his/her mobile phone to detect the quality of the raw material of the textile by capturing image of the raw material. Hence the analysis and determination of quality of the raw material can occur in real time and the cost for determination of the quality of the raw material of the textile is almost negligible.

For example, user 110 can use his/her mobile to capture the one or more images of the raw material and the system 102 can be used to analyze the captured one or more images and further extract the one or more attributes of the captured one or more images. Further the one or more attributes can be determined based on analysis by the system 102 that can be displayed on the mobile phone of the user.

In an embodiment, when the raw material is fibre the one or more attributes can include length, strength, micronnaire, denier, moisture, colour code, trash, elongation, short fibre index, contamination and neps; when the raw material is yarn the one or more attributes can include count, hairiness, elongation, moisture, strength, thin and thick faults, contamination and openness; and when the raw material is fabric the one or more attributes can include hairiness, thin and thick faults, contamination, neps, composition, evenness, elongation and strength.

Those skilled in the art would appreciate that as colors vary due to daylight and light exposure thresholds used by various techniques may not hold good for all scenarios, therefore, the embodiments of the present disclosure use a gradient based detection technique whose performance is minimally influenced by changes in lighting conditions. Further, unlike existing techniques that use shallow classifiers such as Support Vector Machine (SVM) that uses hand crafted features such as Histogram of Oriented Gradients (HOG) that can be used for performing both feature extraction and recognition.

Figure 2:
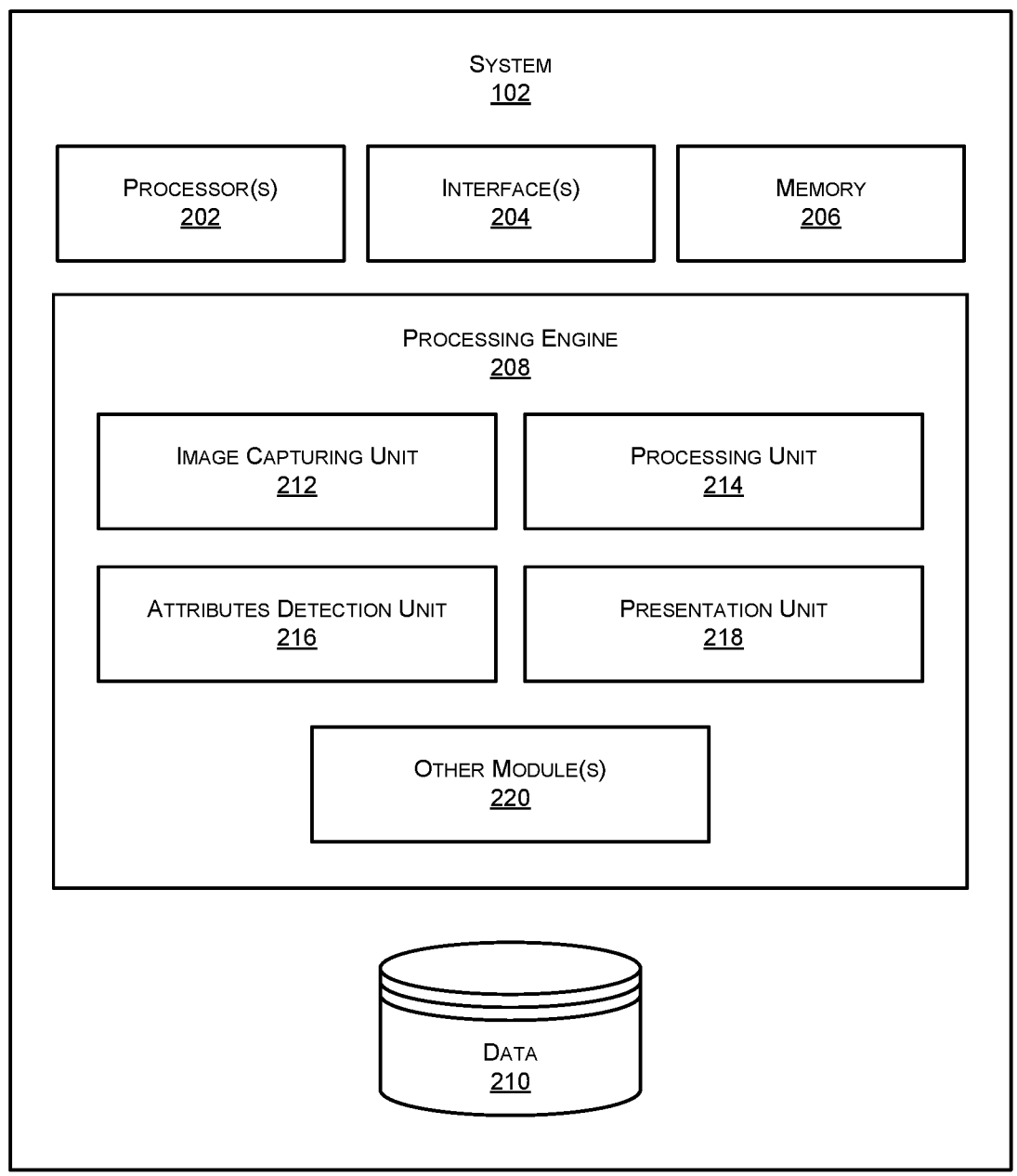
FIG. 2 illustrates exemplary functional modules of a system to determine quality attributes of raw material of textile in accordance with an embodiment of the present disclosure.

FIG. 2 illustrates exemplary functional modules of a system to determine quality attributes of raw material of textile in accordance with an embodiment of the present disclosure.

In an aspect, the system 102 may comprise one or more processor(s) 202. The one or more processor(s) 202 may be implemented as one or more microprocessors, microcomputers, microcontrollers, digital signal processors, central processing units, logic circuitries, and/or any devices that manipulate data based on operational instructions. Among other capabilities, the one or more processor(s) 202 are configured to fetch and execute computer-readable instructions stored in a memory 206 of the system 102. The memory 206 may store one or more computer-readable instructions or routines, which may be fetched and executed to create or share the data units over a network service. The memory 206 may comprise any non-transitory storage device including, for example, volatile memory such as RAM, or non-volatile memory such as EPROM, flash memory, and the like.

The processing unit 104 may also comprise an interface(s) 204. The interface(s) 204 may comprise a variety of interfaces, for example, interfaces for data input and output devices, referred to as I/O devices, storage devices, and the like. The interface(s) 204 may facilitate communication of the system 102 with various devices coupled to the system 102 such as the computing device 106. The interface(s) 204 may also provide a communication pathway for one or more components of the system 102. Examples of such components include, but are not limited to, processing engine(s) 208 and data 210.

The processing engine(s) 208 may be implemented as a combination of hardware and programming (for example, programmable instructions) to implement one or more functionalities of the processing engine(s) 208. In examples described herein, such combinations of hardware and programming may be implemented in several different ways. For example, the programming for the processing engine(s) 208 may be processor executable instructions stored on a non-transitory machine-readable storage medium and the hardware for the processing engine(s) 208 may comprise a processing resource (for example, one or more processors), to execute such instructions. In the present examples, the machine-readable storage medium may store instructions that, when executed by the processing resource, implement the processing engine(s) 208. In such examples, the system 102 may comprise the machine-readable storage medium storing the instructions and the processing resource to execute the instructions, or the machine-readable storage medium may be separate but accessible to the system 102 and the processing resource. In other examples, the processing engine(s) 208 may be implemented by electronic circuitry.

The data 210 may comprise data that is either stored or generated as a result of functionalities implemented by any of the components of the processing engine(s) 208.

In an exemplary embodiment, the processing engine(s) 208 may comprise an image receive module 212, and image processing module 214, an image attributes extraction module 216, a quality determination module 218, a presentation module 220 and other module(s) 222.

It would be appreciated that modules being described are only exemplary modules and any other module or sub-module may be included as part of the system 102. These modules too may be merged or divided into super-modules or sub-modules as may be configured.

In an embodiment, the image receive module 212 can be configured to capture one or more images of the raw material. A camera 108 communicatively coupled with a computing device 106 associated with the user 110 can be used to capture the one or more images. The one or more images captured can be either stored temporarily on the computing device 106 or can be directly sent to the system 102. The one or more captured images must be such that the raw material is captured with precise clarity and are well focused. The one or more images should be captured such that the camera 108 is at an optimal distance from the raw material such that the one or more images captured can be used to detect one or more attributes of the raw material. In an embodiment, the image receive module 212 can be configured to capture a video of the raw material.

In an embodiment, the image processing module 214 can be configured to process the one or more images captured. The image processing module 214 can include functions such as image processing, digitization of image and the like. Further, the image processing module 214 can be configured to run an algorithm(s) or software that assesses/evaluates/calculates the captured one or more images.

The dynamic development of computing techniques creates broad possibilities for their application, including identifying and measuring the geometrical dimensions of very small objects including raw material of textile. Digital image analysis permits detailed analysis of such basic structural parameters of linear textile products as thickness, hairiness, number of twists and the like. These techniques enable the estimation of other characteristic features of the external structure of linear textile products, such as twist parameter and linear density coefficient. The process of identifying structural yarn parameters is a significant problem, in the light of both hitherto conducted scientific investigations and current industrial practice. On the basis of the literature considering this problem, we can state that the image processing technique enables images of longitudinal & transversal cross-sections of fibres to be obtained, the fibres diameters to be further assessed, and the one or more images of linear textile products create which allow the observation of possible yarn faults. The one or more images obtained can help to create two-dimensional and three-dimensional textile products, including images of spliced yarn-end connections and estimates of their correctness. On the basis of the literature, it can also be concluded that digital image processing of the textile products' images mainly considers processing of 2D-images.

The digital analysis of two-dimensional images is based on processing the one or more images acquired. The one or more images can be described by a two-dimensional matrix of real or imaginary numbers presented by a definite number of bytes. The system of digital image processing may be presented schematically. Digital image processing includes: image acquirement and modeling, image quality improvement and highlighting its distinguishing features, reinstating the desired image features, and compression of image data.

Image modeling is based on digitizing the captured one or more images. This process consists of sampling and quantifying the captured one or more images. The digital image can be described in the form of a two-dimensional matrix, whose elements include quantified values of the intensity function, referred to as grey levels. The digital image is defined by the spatial image resolution and the grey level resolution. The smallest element of the digital image is called the pixel. The number of pixels and the number of brightness levels may be unlimited, although while presenting computer technique data it is customary to use values which are multiplications of the number 2, for example 512×512 pixels and 256 grey levels. Image quality improvement and highlighting its distinguished features are the most often used application techniques for image processing. The process of image quality improvement does not increase the essential information represented by the image data, but increases the dynamic range of selected features of the acquired object, which facilitates their detection.

The following operations are carried out during image quality improvement: changes of the grey level system and contrast improvement, edge exposition, pseudo-colorization, improvement of sharpness, decreasing the noise level, space filtration, interpolation and magnification, and compensation of the influence of interference factors, e.g. possible under-exposure.

The histogram method can be used for image correction procedures. A histogram method can be defined as a statistic distribution of particular grey level features occurring in the digital image. This procedure is used mainly for increasing contrast, raising the shade of over-exposed images, and highlighting under-exposed images. The modification of a histogram changes the histogram edge's function.

Another method of image correction is averaging the brightness function, which is called the averaging mask procedure. Applying this procedure results in substituting the primary brightness of the given pixel by the average brightness of a selected surrounding. This procedure aims to eliminate the small deformations which are manifested when exposed points or spots occur. The use of the averaging mask procedure in digital image processing increases the sharpness of the objects' shapes. The woven fabric from after the operation of leveling the histogram and using the procedure of the averaging mask Median filtration refers to the option of averaging the brightness function, and is based on a different rule of determining the new pixel value than is done in the averaging mask procedure. The median filtration is not based on using the average pixel value of a selected surrounding, but accepts the nearest brightness value which exists in the given surrounding. The median filtration stresses and marks off the contours existing in the image. By using the median filtration together with averaging filters, we can obtain better effects than without these filters, as averaging increases the efficiency of contour allocation. The median filter may be used at all color modes, with the exception of the 48-bit RGB mode, the 16-bit grey range, the color mode with palette, and the black-and white mode.

The threshold procedure, which is one of the gradient methods, is used for extracting the contours from the image analyzed. It is based on changing the brightness function value of the particular image pixels. Many kinds of mask can be used for applying gradient methods. The Laplace filter is an example of a gradient filter which enables a contour to be extracted, while at the same time it maintains the previous brightness inside the marked-off area. The grey-scale thresholding process enables image segmentation. It can be carried out by applying a process in which the grey level of the surface of the image analyzed is compared with a defined grey level. As the result of this comparison, every area is accepted as white, if its grey level is higher than that of the defined threshold, and as black, if the grey level is smaller than the value of the defined threshold.

The threshold procedure enables boundary brightness values to be determined and set, in other words, setting a threshold. Pixels with values higher or lower than the threshold value are projected as white or black depending on the selected option. The remaining pixels are not changed, and maintain their previous color. The option of 'both levels' causes all pixels to change into white or black, according to the value relation of their brightness to the threshold value defined. The threshold can be determined for the whole mask of the image analyzed or for a selected color channel only. Autocorrelation is a different image processing technique, which combines all the analyzed image fragments, and is often used to characterize repeated mask structures of the image analyzed.

Applying autocorrelation creates the possibility to determine the average dimensions of repeated units of the object's analyzed mask. This technique makes it easy to reproduce the repeated pixel units in relation to the whole image analyzed. Frequency methods, in turn, are based on modification of the Fourier transform of the intensity function. An improvement of the analyzed image is obtained by determining the reverse transform. Frequency methods require great calculation power, as filtration includes all the points of the image in the frequency space, and not only some limited surrounding of the given pixel. Frequency methods enable such factors to be eliminated or compensated, such as illumination in homogeneity and the geometrical faults of the image acquirement path. Application of low-pass and high-pass filters enables the intensity function and contour underlining to be smoothed out.

The woven fabrics after application of the frequency method based on the Fourier transform. Erosion and dilatation are among the commonly applied morphological operations used to correct the image analysed. The correction procedure of erosion and dilatation is based on adding or eliminating pixels from the mask of the binary image, according to the rules formulated on the basis of standards obtained from neighboring pixels. The woven fabric after application of the erosion and dilatation procedure on the mask previously processed by the threshold procedure. Reinstating desired image features Reinstating desired image features is connected with eliminating and minimizing any image features which lower its quality. Acquiring images by optical, opto-electronic or electronic methods involves the unavoidable degradation of some image features during the detection process.

Aberrations, internal noise in the image sensor, image blurring caused by camera defocusing, as well as turbulence and air pollution in the surrounding atmosphere may cause a worsening of quality. Reinstating the desired image features differs from image improvement, whose procedure is related to highlighting or bringing to light the distinctive features of the existing image. Reinstating the desired image features mainly includes the following corrections: reinstating the sharpness lowered as the result of disadvantageous features of the image sensor or its surrounding, noise filtration, distortion correction, and correction of sensors' nonlinearity.

In an embodiment, the Histogram of oriented gradients (HOG) features can be extracted from each enhanced one or more images, and further can be averaged, and based on averaging extracted HOG features can be used to obtain corrected the enhanced one or more images with more such that the one or more attributes are more profound.

In an embodiment, the image attributes extraction module 216 can be configured to detect one or more attributes associated with the raw material. The one or more attributes can include but not limited to grey scale level, contrast, edge exposition, pseudo-colorization, sharpness, noise level, space filtration, interpolation, magnification, and compensation of the influence of interference factors of the raw material being analyzed for fabrication of fibre, yarn, fabric, apparel and the like. Based on processing the one or more images the one or more attributes associated with the raw material can be extracted. The extracted values of one or more attributes associated with the raw material can be used to determine the quality of the fabric or the textile. In an embodiment, the image attributes extraction module 216 can process the enhanced one or more images and compare the values with predefined stand values for determination of the one or more attributes of the raw material.

In an embodiment, an algorithm or software or hardware or combination of hardware and software and algorithm can be configured to process either on the computing device 106 associated with the user 110 or stored at a system 102. The digitally processed one or more images can be used to determine the one or more attributes associated with the raw material.

In an embodiment, the quality determination module 218 can be configured to fetch reference attribute values, from a first database or the second database (or both), corresponding to the attributes being extracted by the image attributes extraction module 216 and further configured to compare the extracted values of the one or more attributes with corresponding value of the reference attributes. Further, based on comparison of the extracted values with reference attribute values quality of the raw material can be determined.

In an embodiment, when the raw material is fibre the one or more attributes can include length, strength, micronnaire, denier, moisture, colour code, trash, elongation, short fibre index, contamination, neps and the like; when the raw material is yarn the one or more attributes can include count, hairiness, elongation, moisture, strength, thin and thick faults, contamination, openness and the like; and when the raw material is fabric the one or more attributes can include hairiness, thin and thick faults, contamination, neps, composition, evenness, elongation, strength and the like.

For example, when the user captures the image of raw cotton fibre with his/her mobile phone, the system 102 can extract the attributes related with the cotton fibre and the reference attribute values for cotton can be fetched from the database and compared with the extracted attributes and thus based on comparison the quality of the cotton fibre can be determined.

It would be appreciated by the person skilled in the art that the system 102 can be configured inside the computing device 106 having the camera, thus can be used to determine the quality attributes of the raw materials such as fibre of cotton, jute, polyester and the like, the yarn made from the fibre and the fabric made by the yarn and the like.

In an embodiment, the presentation module 220 can be configured to present the determined values of one or more attributes to the user 110 on his/her computing device 106. It would be appreciated that, when the determined one or more attributes associated with the raw material is presented to the user, the user can use the one or more attributes to detect or determine the quality of fabric or textile. Also, in an embodiment the presentation module 220 can notify the determined values of one or more attributes to the computing device 106 through text message, multimedia message, and the like.

Thus, embodiments of the present disclosure can provide a centralized technique that can save time and provide convenience to the user while he/she can determine the one or more attributes by capturing the one or more images of the raw material to be analyzed and uploading the captured one or more images. The one or more images can be transmitted to the system 102 either manually by the user or automatically by the image capturing unit 212. Also, implementation of various embodiments of the present disclosure can save memory space in the computing device of the user by eliminating the need of saving the one or more images captured in the cache memory of the computing device 106.

For example, the user wants to determine the one or more attributes of a material, he/she can capture images of the material and can be uploaded to the system. The system in turn will determine the attributes and display the attributes detected on the computing device associated with the user.

Figure 3:
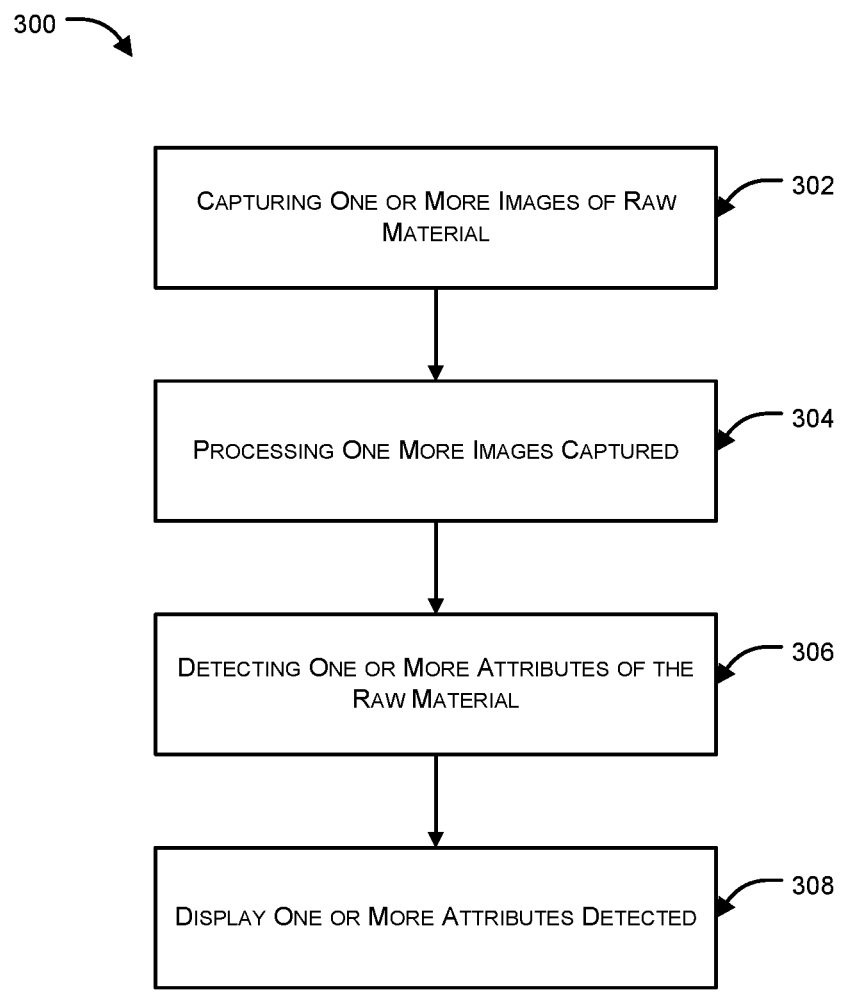
FIG. 3 illustrates a flow diagram illustrating a process of determining quality attributes of raw material of textile in accordance with an embodiment of the present disclosure.

FIG. 3 illustrates a flow diagram illustrating a process of determining quality attributes of raw material of textile in accordance with an embodiment of the present disclosure.

In an embodiment, the process of determining one or more quality related attributes of the raw material can be initiated at step 302, which pertains to receiving, one or more images of the raw material captured by the imaging device. Further at step 304, one or more features of the received one or more images can be enhanced to obtain dynamically enhanced one or more images.

In an embodiment, at step 306 values of one or more attributes of the enhanced one or more images can be extracted, wherein the one or more attributes can include any or combination of staple length, fibre fineness, short fibre content, yarn hairiness, yarn count, yarn elongation, maturity and moisture content. Further, at step 308 the extracted one or more attributes can be compared with the attributes values stored in the first database or second database (or both). Also, at step 310 the quality of the raw material can be determined based on comparison of the extracted values with the reference attribute values.

Figure 4:
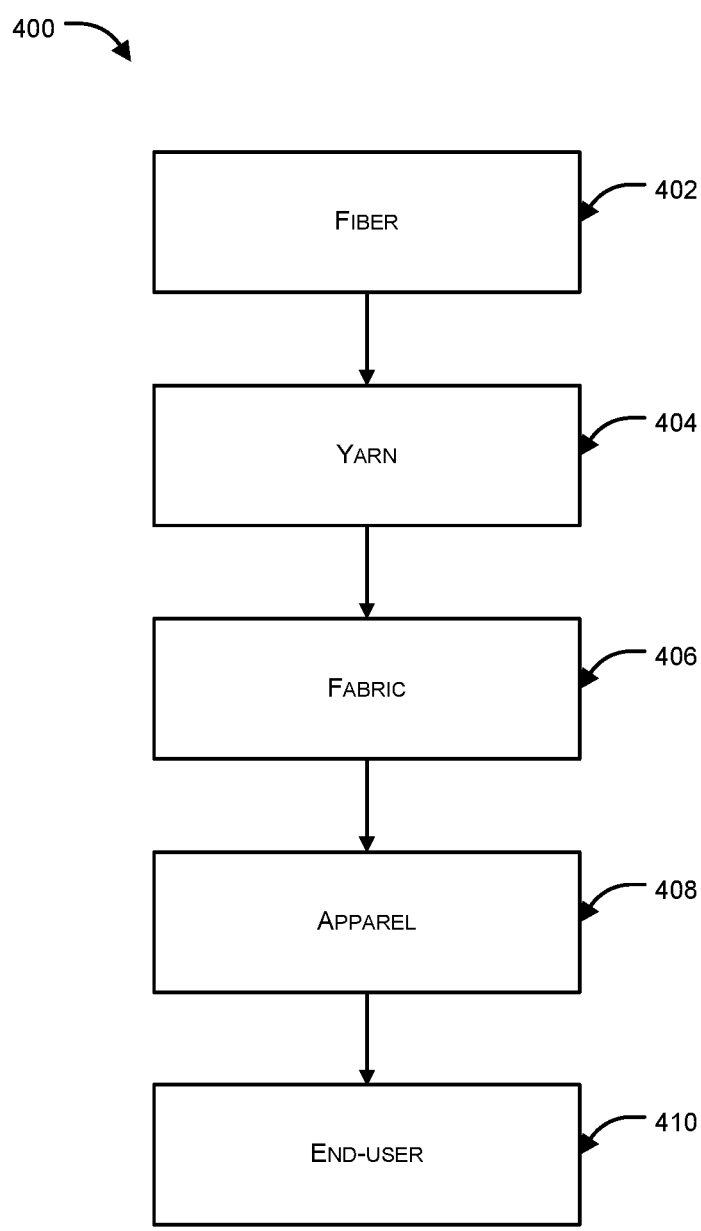
FIG. 4 illustrates a flow diagram illustrating steps of textile industry.

FIG. 4 illustrates a flow diagram illustrating steps of textile industry.

In an exemplary embodiment, steps involved in textile industry can be initiated at step 402 that pertains to accumulating of the raw material or fibre. Further, step 404 pertains to preparation of yarn i.e. yarn can be produced by the spinning operation, either by a hand spinner using the simplest drop spindle or spinning wheel, or spun on the latest automated spinning frame. Further step 406 pertains to making of fabric using raw material or fibre. Fabric can be made by weaving, knitting, crocheting, knotting, felting and the like. Furthermore, step 408 pertains to stitching of the apparel. Also step 410 pertains to purchasing the apparel by the consumer or end-user.

Further, the present disclosure provides a detecting system and method that can enable the farmer to get optimum value for his/her production. The computing device can be used to check quality of the product thereby assisting him/her to get best value for his/her produce. Furthermore, one or more attributes associated with the material being analyzed, are evaluated/assessed at various stages of production of the textile or fabric or apparel. Also, the evaluation/assessment can be done in real time and also does not require an expert to perform various measurements that is time efficient as well as cost efficient. Furthermore, the system and method can be used by the government agencies to calculate the appropriate amount of tax that needs to be paid.

Figure 5:
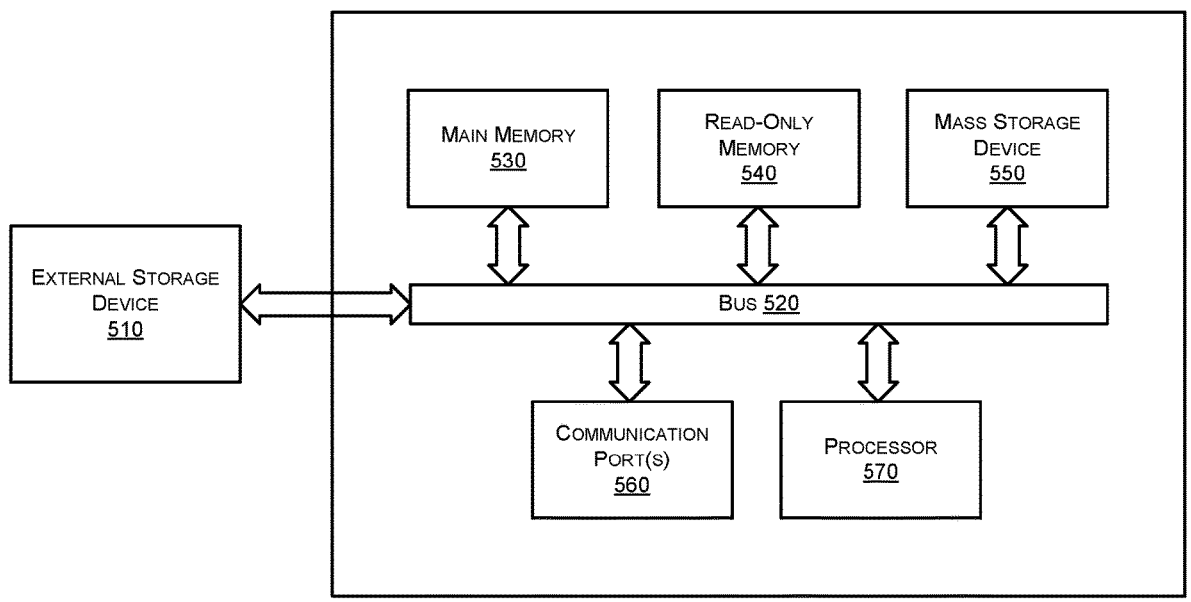
FIG. 5 illustrates an exemplary computer system in which or with which embodiments of the present invention can be utilized in accordance with embodiments of the present disclosure.

FIG. 5 illustrates an exemplary computer system in which or with which embodiments of the present invention can be utilized in accordance with embodiments of the present disclosure.

Computer system 500 includes a bus 520 or other communication mechanism for communicating information, and a processor 570 coupled with bus 520 for processing information. Computer system 500 can also include a main memory 530 or other non-transitory computer-readable medium, such as a random-access memory (RAM) or other dynamic storage device, which can then be coupled to bus 520 for storing information and instructions to be executed by processor 570. Main memory 530 also may be used for storing temporary variables or other intermediate information during execution of instructions to be executed by processor 570. Computer system 500 may further include a read only memory (ROM) 540 or other static storage device coupled to bus 520 for storing static information and instructions for processor 570. A data/external storage device 510, such as a magnetic disk or optical disk, is provided and coupled to bus 520 for storing information and instructions.

Computer system 500 may be coupled via bus 520 to a display (not shown), such as a cathode ray tube (CRT), for displaying information to a user. An input device (not shown), including alphanumeric and other keys, can be coupled to bus 520 for communicating information and command selections to processor 570. Another type of user input device can be cursor control, such as a mouse, a trackball, or cursor direction keys for communicating direction information and command selections to processor 570 and for controlling cursor movement on display. This input device typically has two degrees of freedom in two axes, a first axis (e.g., x) and a second axis (e.g., y), that allows the device to specify positions in a plane.

The invention is related to the use of computer system 500 for creation and management of BOMs as elaborated above. According to some embodiments of the invention, such use may be provided by computer system 500 in response to processor 570 executing one or more sequences of one or more instructions contained in the main memory 730. Such instructions may be read into main memory 530 from another computer-readable medium, such as storage device 550. Execution of the sequences of instructions contained in main memory 530 causes processor 570 to perform the process steps described herein. One or more processors in a multi-processing arrangement may also be employed to execute the sequences of instructions contained in main memory 530. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 570 for execution. Such a medium may take many forms, including but not limited to, non-volatile media, volatile media, and transmission media. Non-volatile media includes, for example, optical or magnetic disks, such as storage device 550. Volatile media includes dynamic memory, such as main memory 530. Transmission media includes coaxial cables, copper wire and fibre optics, including the wires that comprise bus 520. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 570 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 520 can receive the data carried in the infrared signal and place the data on bus 520. Bus 520 carries the data to main memory 530, from which processor 570 retrieves and executes the instructions. The instructions received by main memory 530 may optionally be stored on storage device 550 either before or after execution by processor 570.

Computer system 500 also includes a communication interface 560 coupled to bus 520. Communication interface 560 can provide a two-way data communication coupling to a network link (not shown) that can be connected to a local network (not shown). For example, communication interface 560 may be an integrated services digital network (ISDN) card or a modem to provide a data communication connection to a corresponding type of telephone line. As another example, communication interface 560 may be a local area network (LAN) card to provide a data communication connection to a compatible LAN. Wireless links may also be implemented. In any such implementation, communication interface 560 sends and receives electrical, electromagnetic or optical signals that carry data streams representing various types of information.

Although the proposed system has been elaborated as above to include all the main parts, it is completely possible that actual implementations may include only a part of the proposed modules/engines or a combination of those or a division of those in various combinations across multiple devices that can be operatively coupled with each other, including in the cloud. Further the modules/engines can be configured in any sequence to achieve objectives elaborated. Also, it can be appreciated that proposed system can be configured in a computing device or across a plurality of computing devices operatively connected with each other, wherein the computing devices can be any of a computer, a laptop, a smart phone, an Internet enabled mobile device and the like. All such modifications and embodiments are completely within the scope of the present disclosure.

Embodiments of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

ADVANTAGES OF THE PRESENT DISCLOSURE

The present disclosure provides a system and method for determining quality attributes of a raw material of a textile.

The present disclosure provides a system and method that enables determining quality attributes of a raw material of a textile in real time, thus reduces time required for determination.

The present disclosure provides a system and method for determining quality attributes of a raw material of a textile that is cost efficient.

The present disclosure provides a system and method for determining quality attributes of a raw material of a textile that is portable and easy to use.

The present disclosure provides a system and method that empowers entire chain of textile industry to determine quality attributes of a raw material of a textile.

The present disclosure provides a system and method that enables determining quality attributes of a raw material of a textile at every stage that includes fibre, yarn and fabric.

I claim:

1. A system for determining quality attributes of a raw material of a textile, said system comprising:

a processor coupled with a memory, the memory storing instructions executable by the processor to:

receive one or more images of said raw material captured by an imaging device, wherein said one or more images comprise a feature;

enhance said feature of said received one or more images by varying dynamic range of said feature of said received one or more images to obtain dynamically enhanced one or more images, wherein said feature is selected from a group consisting of grey scale level, contrast, edge exposition, pseudo-colorization, sharpness, noise level, space filtration, interpolation, magnification, and compensation of influence of interference factors and combinations thereof, wherein varying the dynamic range of said feature comprises increasing the dynamic range of said feature without increasing essential information of said one or more images;

extract values of one or more attributes of said enhanced one or more images, wherein said one or more attributes includes staple length, fibre fineness, short fibre content, yarn hairiness, yarn count, yarn elongation, maturity and moisture content; and compare the extracted values with reference attribute values stored in a first database, wherein quality of said raw material is determined based on comparison of the extracted values with the reference attribute values.

2. The system as claimed in claim 1, wherein the processor configured to extract Histogram of oriented gradients (HOG) features from each enhanced one or more images, and average HOG features thus extracted.

3. The system as claimed in claim 1, wherein the system comprises a computing device configured to present the determined quality of said raw material.

4. The system as claimed in claim 3, wherein said imaging device comprises a digital camera operatively coupled with said computing device.

5. The system as claimed in claim 1, wherein said imaging device having an illuminating source.

6. The system as claimed in claim 1, wherein the captured one or images, enhanced one or more images, extracted values of one or more attributes, and retrieved reference attribute values are stored in any of said first database and a second database.

7. The system as claimed in claim 1, wherein the raw material of the textile comprises at least fibre, yarn or fabric.

8. A method for determining quality attributes of a raw material of a textile using a processor that executes instructions that are stored in memory, said method comprising the steps of:

receiving, by said one or more processors, one or more images of said raw material captured by the imaging device, wherein said one or more images comprise a feature;

enhancing, by said one or more processors, said feature of said received one or more images by varying dynamic range of said feature of said received one or more images to obtain dynamically enhanced one or more images, wherein said feature is selected from a group consisting of grey scale level, contrast, edge exposition, pseudo-colorization, sharpness, noise level, space filtration, interpolation, magnification, and compensation of the influence of interference factors and combinations thereof, wherein varying the dynamic range of said feature comprises increasing the dynamic range of said feature without increasing essential information of said one or more images;

extracting, by said one or more processors, values of one or more attributes of said enhanced one or more images, wherein said one or more attributes includes staple length, fibre fineness, short fibre content, yarn hairiness, yarn count, yarn elongation, maturity and moisture content;

comparing, by said one or more processors, the extracted values with reference attribute values stored in a first database; and determining, by said one or more processors, quality of said raw material based on comparison of the extracted values with the reference attribute values.

9. The method as claimed in claim 8, wherein the method comprises extracting Histogram of oriented gradients (HOG) features from each enhanced one or more images, and averaging extracted HOG features.

* * * * *